United States Patent [19]
Norris

[11] 4,028,159
[45] June 7, 1977

[54] RESIN RECLAMATION IN CARPET MANUFACTURE

[75] Inventor: Alan H. Norris, Rome, Ga.

[73] Assignee: Champion International Corporation, Stamford, Conn.

[22] Filed: Apr. 7, 1976

[21] Appl. No.: 674,413

Related U.S. Application Data

[63] Continuation-in-part of Ser. No. 480,693, June 19, 1974, abandoned.

[52] U.S. Cl. .................. 156/94; 156/334; 260/2.3; 264/37; 427/345
[51] Int. Cl.² .......................................... B32B 35/00
[58] Field of Search ............ 260/669 R, 669 A, 2.3; 264/37; 210/71; 427/345; 156/327, 334

[56] References Cited
UNITED STATES PATENTS

| | | | |
|---|---|---|---|
| 3,684,600 | 8/1972 | Smedberg | 156/334 |
| 3,857,799 | 12/1974 | Ooba et al. | 260/2.3 |
| 3,923,653 | 12/1975 | Lavins | 210/71 |
| 3,941,066 | 3/1976 | Itoh et al. | 428/481 |
| 3,956,414 | 5/1976 | Oshima | 260/2.3 |

Primary Examiner—Edward G. Whitby
Attorney, Agent, or Firm—Evelyn M. Sommer

[57] ABSTRACT

Selvedge from carpeting containing meltable resin content is heated to melt and degrade said resin which is then separated by screening or straining from any solid residue. As an example, tufted carpeting having nylon yarn pile secured in a woven polypropylene primary back which is bonded by a thermoplastic adhesive to the pile yarns and to a secondary back of woven jute is so treated to separate a significant quantity of the resin from the jute. The jute residue may be incinerated to utilize the latent thermal energy therein. Alternatively, the secondary back may be of thermoplastic material or may be omitted. The reclaimed degraded resin is then substituted for the high molecular weight copolymer which constitutes a component of the adhesive for subsequent carpet manufacture.

The process may be carried out in a double-walled vessel wherein the inner wall is pervious or it can be carried out with apparatus having a moving web of pervious material for supporting the selvedge or the like.

7 Claims, 4 Drawing Figures

RESIN RECLAMATION IN CARPET MANUFACTURE

This application is a continuation-in-part of my prior pending application, Ser. No. 480,693, filed June 19, 1974 now abandoned.

The present invention relates to the process of producing carpeting and, more particularly, to operations performed after tufting.

Various ways are known to produce carpets involving different techniques for securing pile yarns in a supporting backing material. While the present invention is not limited thereto, it is best explained in connection with the manufacture of tufted carpet in which the pile yarns are inserted in a prewoven primary backing. As is well known, liquid latex coatings have been applied to the backs of tufted carpets to lock the yarns in place but, more recently, quick hardening thermoplastic resin adhesives have been replacing the slow drying and curing latex for such purpose. In addition, a secondary back of woven material is often applied to the latex or resin adhesive to add strength to the carpet and increase the holding of the pile yarns.

The secondary back is generally woven from jute while the primary back, formerly produced from jute, is now often made from synthetic resin fibers such as polypropylene resin. Also, more and more yarns are being made of synthetic resin fibers, e.g., nylon, polypropylene, polyester, instead of natural fibers such as wool or cotton.

A typical modern day tufted carpet may have nylon pile secured in a primary back of woven polypropylene fabric bonded by a resin adhesive to a woven jute secondary back with said adhesive being compounded from an amorphous low molecular weight polyethylene resin, a high molecular weight ethylene vinyl acetate copolymer resin and a filler. The pile, the primary back and the adhesive are thermoplastic in character with distinct melting points above which they become liquid. Furthermore, the adhesive is applied to the primary back at an elevated temperature in its melt state. Upon cooling, which can be effected quite rapidly, the adhesive solidifies completing the bond between yarns and backs.

As the carpet comes from the finishing line it has a selvedge which heretofore has been treated as scrap and disposed of at significant cost. However, it will be appreciated that the selvedge, generally several inches in width, contains a substantial quantity of valuable resin. For example, it has been estimated that in the production of 10 million square yards of 12 foot wide carpet with 3 inch selvedge on each side, approximately 880,000 pounds of resin would be in the selvedge if the carpet were to contain 20 oz./sq. yd. nylon pile, 4 oz./sq. yd. of woven polypropylene primary back, and 27 oz./sq. yrd. of resin adhesive.

With the foregoing in mind, it is an object of the present invention to provide a method for reclaiming a resin from the selvedge of said carpet. More particularly, it is an object to provide for reclamation of the meltable resin therefrom.

As a corollary object, it is a purpose of the present invention to make use of the materials in said selvedge even when such materials are not readily melted, or in fact, do not melt.

It is a further object of the present invention to provide a method whereby material, previously handled as scrap, can, at minimum cost, be used to replace an expensive component of the aforementioned adhesive.

In accordance with one aspect of the present invention there is provided a process of producing carpeting which includes the steps of removing and collecting selvedge during production from carpet material which includes at least one yarn supporting back of thermoplastic resin, an adhesive mixture of high and low molecular weight resins with a filler, and pile yarns formed from high molecular weight synthetic resin fibers selected from the group consisting of nylon, polypropylene and polyester fibers; heating said selvedge in air to a temperature above the melting points of said resins to melt and degrade said resins; separating melted resin from solid residue, if any, to reclaim meltable resin from said selvedge; and utilizing said reclaimed resin as a substitute for at least a portion of said high molecular weight resin in an adhesive mixture in subsequent carpet production.

In accordance with a further aspect of the present invention said selvedge is fed to a previous structure on which it is supported during said heating and separating steps with said melted resin passing through said structure. Depending on the nature thereof, the residue on said pervious structure can be incinerated, either to dispose of such residue or to employ gainfully the heat of combustion.

The invention will be better understood after reading the following detailed description of the presently preferred embodiments thereof with reference to the appended drawings in which.

Figure 1:
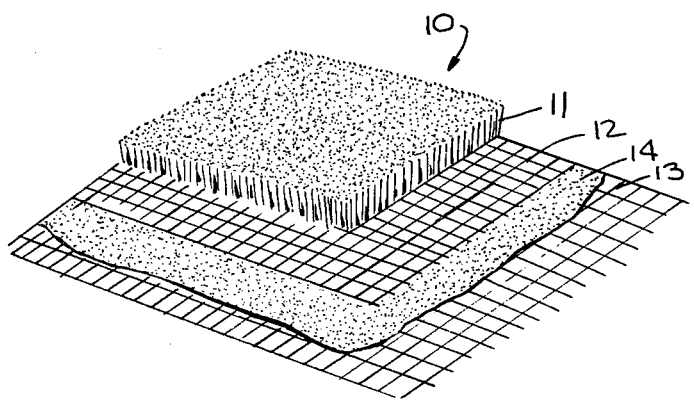
FIG. 1 is a fragmentary view with portions broken away to show the construction of a tufted carpet.

Referring now to the drawings, FIG. 1 shows the construction of tufted carpet, generally designated by the reference numeral 10. The carpet 10 has a pile 11 consisting of yarn secured in a woven primary back 12, preferably of polypropylene. A secondary back 13, of woven jute or woven polyester, is bonded to the primary back 12 by the layer of adhesive 14.

Figure 2:
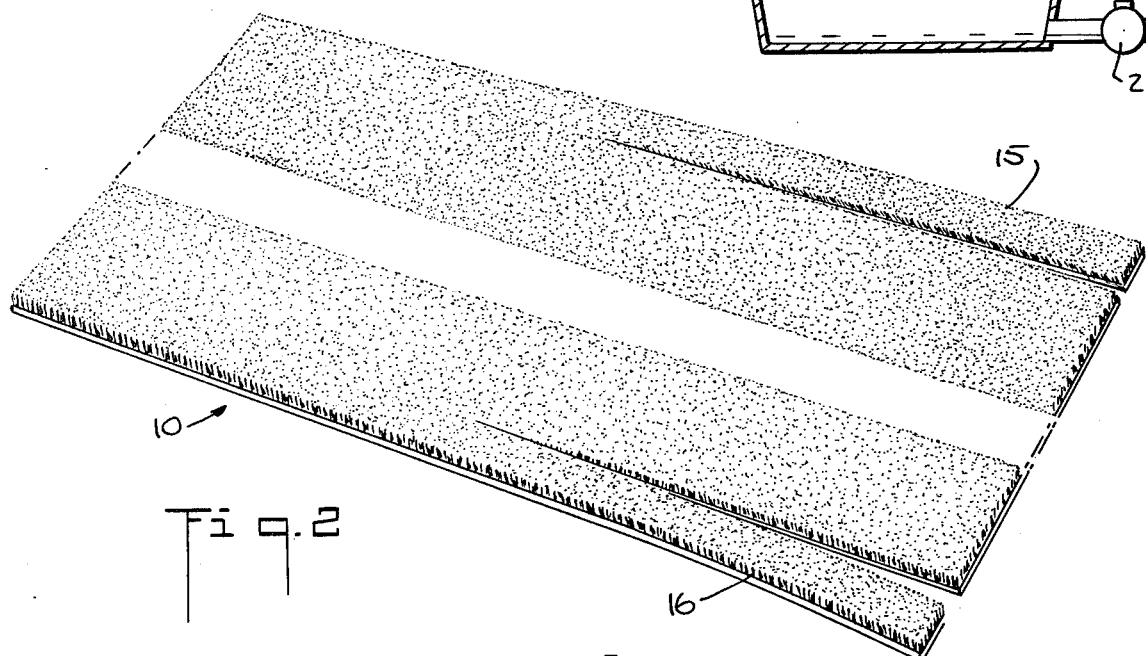
FIG. 2 is a stylized illustration of the removal of the selvedge from the carpet.

As it comes from the tufting frame, the carpet 10 has a selvedge of several inches along both sides at 15 and 16, see FIG. 2, which is removed in conventional manner. It will be appreciated that the selvedge, although containing the usual irregularities, will encompass in its body substantially the same constituents as the main body of the carpet.

Figure 3:
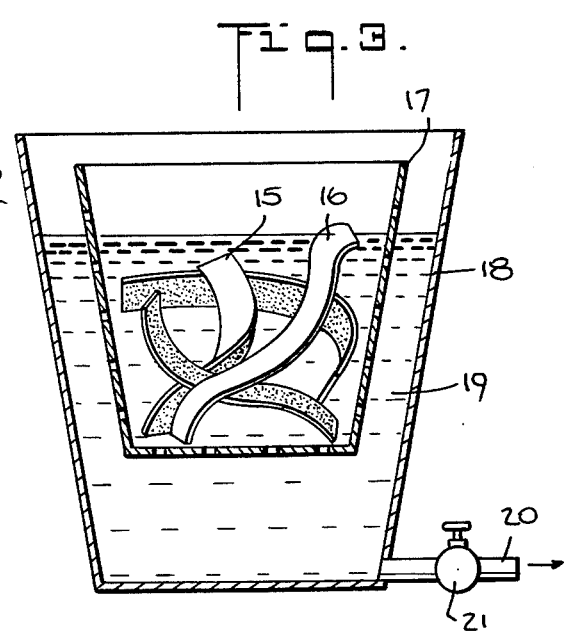
FIG. 3 is a diagrammatic view of apparatus for use in reclaiming resin from the selvedge.

Referring now to FIG. 3, there is shown a pervious structure 17 in the form of a container with a perforate wall supported by means, not shown, within an impervious vessel 18. The vessel 18 is supplied initially with a quantity of substantially pure or virgin adhesive 19, a thermoplastic resin mixture, which is maintained liquified through the application of heat to the vessel 18 in any known manner, not shown. The vessel 18 is heated sufficiently to maintain the adhesive 19 in the liquid state as the selvedge such as 15 and 16 is supplied to container 17. The meltable resin in said selvedge is melted by immersion in the hot resin 19, commingles therewith, and passes through the wall of container 17. As the level of adhesive rises in vessel 18 it can be withdrawn through outlet pipe 20 under control of the valve 21. If desired, the resin withdrawn from vessel 18 may be used directly to produce the coating 14 of FIG. 1 for bonding the secondary back 13 to the primary back 12. It will be understood that after the system has been in operation for a time the resin 19 will tend to be replaced by reclaimed resin and the resin between the walls of vessel 18 and container 17 will be free of solid residue such as jute or other non-meltable components in the selvedge, the non-meltable components being retained within container 17.

If the only meltable resin in the selvedge is the adhesive of layer 14, the composition of the liquid in vessel 18 will degrade in the absence of suitable anti-oxidants. However, if other high molecular weight meltable resins are in the selvedge such as in the yarn and/or the backing, the liquid resin composition in vessel 18, although gradually changing, will tend to retain the necessary properties for use as an adhesive resin. An attempt will now be made to explain this phenomenon.

The starting adhesive contains an amorphous low molecular weight polyethylene resin mixed with a high molecular weight copolymer of ethylene vinyl acetate resin and a filler such as whiting. A typical starting formulation may have 31 parts of the amorphous material, 9 parts of the copolymer and 60 parts whiting. It should be noted that the amorphous resin, although relatively inexpensive, tends to be sticky, gooey and tacky and unsuited for use without modification as the adhesive. The copolymer on the other hand is relatively expensive and, if used by itself, would stiffen carpeting to the point of being unbendable. In the proper proportions the mixture yields an adhesive which is well suited to the stated purpose.

All of the other resins identified above as commonly found in carpeting of the type under consideration are of the high molecular weight category. When the selvedge is heated in air to melt the resins they degrade in known manner. But, and this is the surprising discovery, the so degraded reclaimed material has the ability to modify the character of the amorphous material in much the same manner as the expensive copolymer. Hence, the degraded reclaimed resin can be substituted for at least a proportion of the copolymer. As the mixture in the reclamation vessel or container 18 alters its consistency, additional amorphous material and/or copolymer material and/or filler can be added as required.

Whenever excessive residue has accumulated in container 17 it may be removed in any suitable manner. If said residue, for example, is jute with a minor quantity of adhesive remaining adherent thereto, such residue may be utilized as a fuel in a suitable furnace to extract thermal energy therefrom or it may be incinerated for ready disposal.

Figure 4:
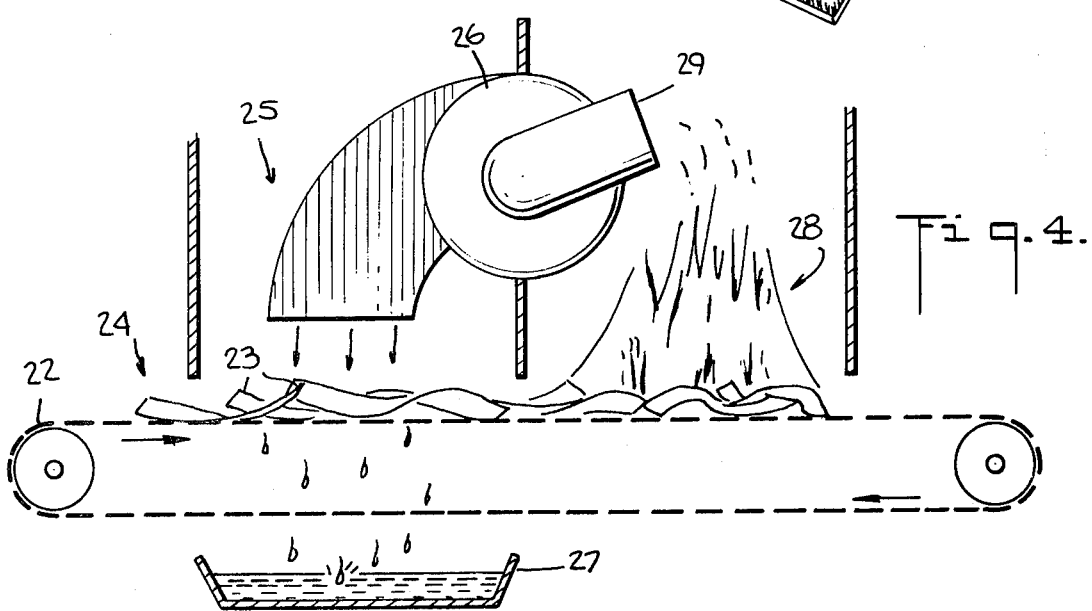
FIG. 4 is a diagrammatic view of another apparatus for reclaiming resin combined with incineration of the residue.

Turning now to FIG. 4, there is shown another arrangement for reclaiming meltable resin from the selvedge and for making use of the residue. A continuous belt or web 22 of pervious construction, e.g., a screen or grate, is mounted as shown for conveying selvedge 23 from a loading zone 24 into a chamber 25. Hot air is blown onto the selvedge by a blower 26 to melt any meltable resin which falls through the web 22 to be collected in a catch basin 27. Further movement of the web 22 conveys the selvedge residue into a combustion chamber 28 where the residue, e.g., jute or the like, is incinerated. The heat of combustion heats the air entering blower 26 via inlet 29, and also may be used in any well known manner, not shown, for any other desired purpose. Thus, incineration is accomplished with gainful employment of the heat of combustion.

In addition to reclaiming meltable resin from selvedge, the apparatus described above may be used to reclaim resin from creel tail outs, shear waste, and the like.

As used herein, the expression "pure adhesive" is intended to define a material sufficiently free from fillers, extenders and other contaminants as to be suitable when melted for direct formation of layer 14 of carpet 10.

As suggested above the entire carpet can be composed of meltable resin, as when the secondary back is not used or has been replaced by a meltable film or sheet or has been replaced by woven or non-woven polypropylene, polyester or nylon cloth.

Having described the subject invention with reference to the presently preferred embodiments thereof, it will be understood that various changes may be made therein without departing from the true spirit of the invention as defined in the appended claims.

What is claimed is:
1. In the process for producing carpeting, the steps of removing and collecting selvedge during production of carpet material comprising:
   a. a yarn supporting back of thermoplastic resin;
   b. an adhesive comprising a mixture of:
      1. an amorphous low molecular weight polyethylene resin;
      2. a high molecular weight ethylene vinyl acetate copolymer resin which is an adhesive modifier for said amorphous resin; and
      3. a filler; and
   c. pile yarns formed from high molecular weight synthetic resin fibers selected from the group consisting of nylon, polypropylene and polyester fibers;

heating said selvedge in air to a temperature above the melting points of said resins to melt and degrade said resins sufficiently to produce adhesive modification characteristics substantially equivalent of said copolymer resin, separating melted resin from solid residue, if any, to reclaim meltable resin from said selvedge and utlizing said reclaimed resin as a substitute for ethylene vinyl acetate copolymer resin in an adhesive mixture in subsequent carpet production.

2. The process of claim 1, wherein said carpet material comprises a primary back of woven polypropylene resin and a secondary back of jute; said resin adhesive secures said secondary back to said primary back; and the melted resins are separated from said jute.

3. The process of claim 2, wherein said selvedge is fed to a previous structure on which it is supported during said heating and separating steps with said melted resin passing through said structure.

4. The process of claim 3, wherein the residue on said previous structure is incinerated after separation of said melted resin.

5. The process of claim 4, wherein said step of incineration is accomplished with gainful employment of the heat of combustion.

6. The process of claim 3, wherein said pervious structure is in the form of a container within an impervious vessel, said vessel is supplied with a quantity of substantially pure adhesive, and heat is applied to said vessel to melt said pure adhesive and maintain it in the liquid state while said selvedge is fed to said container whereby the meltable resin in said selvedge is melted, commingles with said pure adhesive, and passes through the wall of said container.

7. In the process for producing carpeting, the steps of removing and collecting selvedge during production of carpet material comprising:
   a. a yarn supporting back of thermoplastic resin;
   b. an adhesive mixture of high and low molecular weight resins with a filler; and
   c. pile yarns formed from high molecular weight synthetic resin fibers selected from the group consisting of nylon, polypropylene and polyester fibers;

heating said selvedge in air to a temperature above the melting points of said resins to melt and degrade said resins sufficiently to produce adhesive modification characteristics substantially equivalent of said high molecular weight resin; separating melted resin from solid residue, if any, to reclaim meltable resin from said selvedge; and utilizing said reclaimed resin as a substitute for at least a portion of the high molecular weight resin in an adhesive mixture in subsequent carpet production.

* * * * *